(12) United States Patent
Chandler et al.

(10) Patent No.: US 9,587,591 B2
(45) Date of Patent: Mar. 7, 2017

(54) EXHAUST SYSTEM HAVING $N_2O$ CATALYST IN EGR CIRCUIT

(71) Applicant: JOHNSON MATTHEY PUBLIC LIMITED COMPANY, London (GB)

(72) Inventors: Guy Richard Chandler, Cambridge (GB); Alexander Nicholas Michael Green, Baldock (GB); Paul Richard Phillips, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/633,324

(22) Filed: Feb. 27, 2015

(65) Prior Publication Data
US 2015/0240752 A1 Aug. 27, 2015

Related U.S. Application Data

(60) Provisional application No. 61/945,444, filed on Feb. 27, 2014.

(51) Int. Cl.
*F01N 3/00* (2006.01)
*F02M 25/07* (2006.01)
(Continued)

(52) U.S. Cl.
CPC ..... *F02M 25/0717* (2013.01); *B01D 53/9413* (2013.01); *B01D 53/9431* (2013.01); *B01J 23/34* (2013.01); *F01N 3/0231* (2013.01); *F01N 3/035* (2013.01); *F01N 3/0814* (2013.01); *F01N 3/0842* (2013.01); *F01N 3/106* (2013.01); *F01N 3/2066* (2013.01); *F01N 13/009* (2014.06); *F02M 25/10* (2013.01); *F02M 26/06* (2016.02); *F02M 26/35* (2016.02); *B01D 53/9436* (2013.01); *B01D 53/9477* (2013.01); *B01D 2251/206* (2013.01); *B01D 2251/2062* (2013.01); *B01D 2251/2067* (2013.01); *B01D 2251/408* (2013.01); *B01D 2251/606* (2013.01);
(Continued)

(58) Field of Classification Search
USPC .......... 60/274, 278, 286, 295, 297, 301, 303
See application file for complete search history.

(56) References Cited

U.S. PATENT DOCUMENTS 7,299,793 B1 11/2007 Tyo et al.
8,833,059 B2 * 9/2014 Keppeler .............. F01N 3/2066
60/280

(Continued)

FOREIGN PATENT DOCUMENTS

CN 103240081 A 8/2013
DE 102005049309 A1 4/2007
(Continued)

*Primary Examiner* — Binh Q Tran

(57) ABSTRACT

An exhaust system for an internal combustion engine is disclosed. The exhaust system comprises a particulate filter, one or more $NO_x$ reduction catalysts, and a low pressure exhaust gas recirculation (EGR) circuit for connecting the exhaust system downstream of the filter and the one or more $NO_x$ reduction catalysts to an intake of the engine. The EGR circuit comprises a $N_2O$-producing catalyst.

11 Claims, 1 Drawing Sheet

Exhaust System

(51) Int. Cl.

| | | |
|---|---|---|
| *B01J 23/34* | (2006.01) | |
| *F01N 3/08* | (2006.01) | |
| *F01N 3/10* | (2006.01) | |
| *F01N 3/20* | (2006.01) | |
| *F02M 25/10* | (2006.01) | |
| *F01N 3/023* | (2006.01) | |
| *F01N 3/035* | (2006.01) | |
| *F01N 13/00* | (2010.01) | |
| *B01D 53/94* | (2006.01) | |

(52) U.S. Cl.
CPC ..... *B01D 2253/112* (2013.01); *B01D 2253/1124* (2013.01); *B01D 2255/1021* (2013.01); *B01D 2255/1023* (2013.01); *B01D 2255/1025* (2013.01); *B01D 2255/202* (2013.01); *B01D 2255/204* (2013.01); *B01D 2255/2022* (2013.01); *B01D 2255/2025* (2013.01); *B01D 2255/2027* (2013.01); *B01D 2255/2042* (2013.01); *B01D 2255/2045* (2013.01); *B01D 2255/2047* (2013.01); *B01D 2255/2065* (2013.01); *B01D 2255/2068* (2013.01); *B01D 2255/2073* (2013.01); *B01D 2255/2092* (2013.01); *B01D 2255/20738* (2013.01); *B01D 2255/20746* (2013.01); *B01D 2255/20753* (2013.01); *B01D 2255/20761* (2013.01); *B01D 2255/20769* (2013.01); *B01D 2255/20776* (2013.01); *B01D 2255/20784* (2013.01); *B01D 2255/30* (2013.01); *B01D 2255/40* (2013.01); *B01D 2255/407* (2013.01); *B01D 2255/50* (2013.01); *B01D 2255/502* (2013.01); *B01D 2255/504* (2013.01); *B01D 2255/91* (2013.01); *B01D 2255/9205* (2013.01); *B01D 2255/9207* (2013.01); *B01D 2256/00* (2013.01); *B01D 2257/404* (2013.01); *F01N 2610/02* (2013.01); *Y02C 20/10* (2013.01); *Y02T 10/121* (2013.01); *Y02T 10/24* (2013.01)

(56) References Cited

U.S. PATENT DOCUMENTS

| | | | |
|---|---|---|---|
| 8,959,979 B2 * | 2/2015 | Zawacki | F02D 41/1494 73/1.06 |
| 8,978,360 B2 * | 3/2015 | Cavataio | F01N 3/035 60/286 |
| 9,157,356 B2 * | 10/2015 | Balthes | F01N 3/023 |
| 9,228,508 B2 * | 1/2016 | Blumendeller | F02D 21/08 |
| 2003/0202927 A1 | 10/2003 | Minkara et al. | |
| 2006/0029535 A1 | 2/2006 | Ott | |
| 2010/0043410 A1 * | 2/2010 | Wakao | F01N 3/0842 60/287 |

FOREIGN PATENT DOCUMENTS

| | | |
|---|---|---|
| EP | 0496526 A1 | 7/1992 |
| JP | 2007216082 A | 8/2007 |
| RU | 117186 U1 | 6/2012 |
| WO | 9825698 | 6/1998 |
| WO | 2012114187 A2 | 8/2012 |
| WO | 2012120347 A1 | 9/2012 |

\* cited by examiner

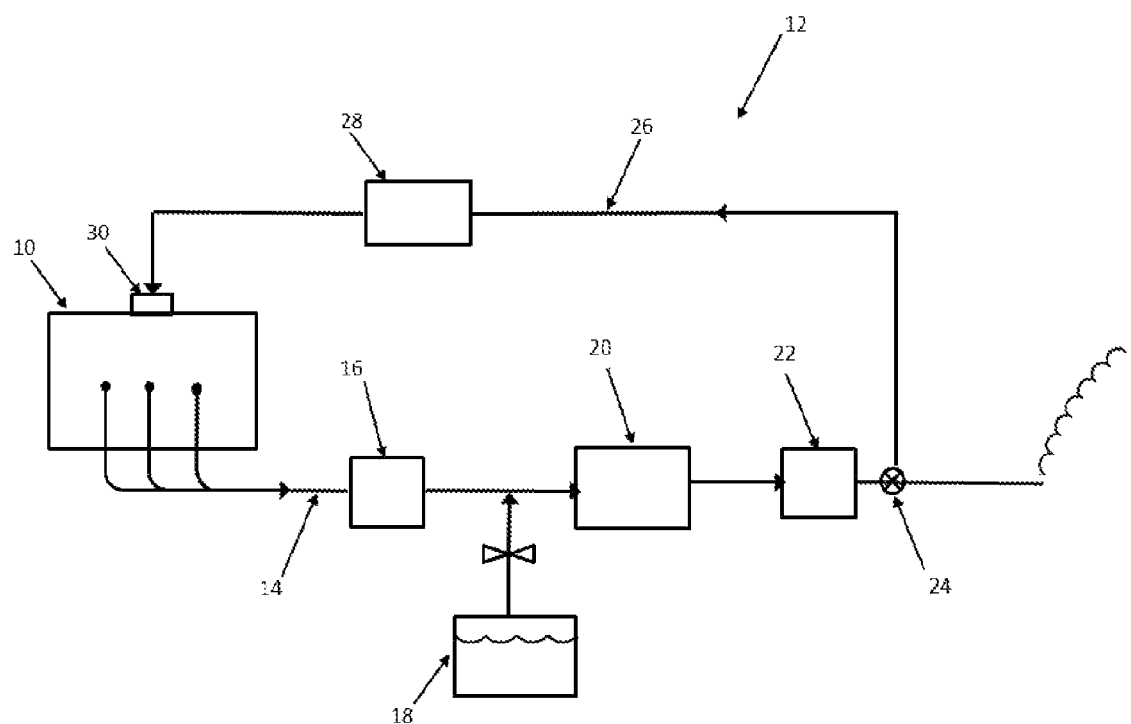
Exhaust System

US 9,587,591 B2

EXHAUST SYSTEM HAVING N₂O CATALYST IN EGR CIRCUIT

FIELD OF THE INVENTION

The invention relates to an exhaust system that contains an exhaust gas recirculation (EGR) circuit, having a $N_2O$-producing catalyst.

BACKGROUND OF THE INVENTION

Internal combustion engines produce exhaust gases containing a variety of pollutants, including hydrocarbons, particulate matter, sulfur oxides, carbon monoxide, and nitrogen oxides ("$NO_x$"), which include nitric oxide (NO), nitrogen dioxide ($NO_2$), and nitrous oxide ($N_2O$). Increasingly stringent national and regional legislation has lowered the amount of pollutants that can be emitted from such diesel or gasoline engines. Many different techniques have been applied to exhaust systems to clean the exhaust gas before it passes to atmosphere.

Exhaust gas recirculation (EGR) is a method for reducing NO emissions from an engine by returning a portion of the engine's exhaust gas to the engine combustion chambers via the air intake. EGR works by lowering the oxygen concentration in the combustion chamber, thereby decreasing the peak temperature of the fuel combustion flame as well as through heat absorption. EGR has been used since the mid-1970s in gasoline fueled passenger car engines. Following the gasoline application, EGR was also introduced to diesel passenger cars and, from the early 2000s, to heavy-duty diesel engines.

Generally, there are two exhaust system arrangements comprising EGR: (i) high pressure loop EGR, in which the exhaust gas is recirculated from upstream of a turbocharger; and (ii) low pressure loop EGR (also called long loop EGR), where exhaust gas is often recirculated from downstream of a particulate filter, allowing all the exhaust gas to be utilized in the turbo. Exhaust gas pressure downstream of the filter is generally lower than at the intake manifold, allowing exhaust gas to flow from the filter to the intake manifold.

The use of EGR systems has been taught in, for example, PCT Intl. Appl. WO 2012/120347 which discloses an exhaust system for a vehicular lean burn internal combustion engine that comprises a low pressure EGR circuit for connecting the exhaust system downstream of a filter to an air intake of the engine, wherein the EGR circuit comprises an ammonia oxidation catalyst. In addition, PCT Intl. Appl. WO 2012/114187 teaches an exhaust system for a vehicular lean burn internal combustion engine comprising a low pressure EGR circuit having a $NO_x$ adsorber catalyst (NAC) comprising a nitric oxide (NO) adsorbent.

As with any automotive system and process, it is desirable to attain still further improvements in exhaust gas treatment systems. We have discovered a new system that utilizes a $N_2O$-producing catalyst within the EGR circuit in order to increase oxygen atom availability within the combustion process to reduce the number of unwanted diesel particulates.

SUMMARY OF THE INVENTION

The invention is an exhaust system for an internal combustion engine. The exhaust system comprises a particulate filter, one or more $NO_x$ reduction catalysts, and a low pressure exhaust gas recirculation (EGR) circuit for connecting the exhaust system downstream of the filter and the one or more $NO_x$ reduction catalysts to an intake of the engine. The EGR circuit comprises a $N_2O$-producing catalyst. The $N_2O$ generated within the EGR circuit will increase oxygen atom availability within the engine for the combustion process to result in a reduction in the number of unwanted diesel particulates.

BRIEF DESCRIPTION OF THE DRAWING

FIG. 1 is a schematic flow diagram of one embodiment of the invention.

DETAILED DESCRIPTION OF THE INVENTION

The exhaust system of the invention comprises a particulate filter, one or more $NO_x$ reduction catalysts, and a low pressure exhaust gas recirculation (EGR) circuit.

Suitable $NO_x$ reduction catalysts include a lean $NO_x$ trap. $NO_x$ traps are devices that adsorb $NO_x$ under lean exhaust conditions, release the adsorbed $NO_x$ under rich conditions, and reduce the released $NO_x$ to form $N_2$. A $NO_x$ trap typically includes a $NO_x$ adsorbent for the storage of $NO_x$ and an oxidation/reduction catalyst. Typically, nitric oxide reacts with oxygen to produce $NO_2$ in the presence of the oxidation catalyst. Second, the $NO_2$ is adsorbed by the $NO_x$ adsorbent in the form of an inorganic nitrate (for example, BaO or $BaCO_3$ is converted to $Ba(NO_3)_2$ on the $NO_x$ adsorbent). Lastly, when the engine runs under rich conditions, the stored inorganic nitrates decompose to form NO or $NO_2$ which are then reduced to form $N_2$ by reaction with carbon monoxide, hydrogen and/or hydrocarbons (or via $NH_x$ or NCO intermediates) in the presence of the reduction catalyst. Typically, the nitrogen oxides are converted to nitrogen, carbon dioxide and water in the presence of heat, carbon monoxide and hydrocarbons in the exhaust stream.

The $NO_x$ adsorbent component is preferably an alkaline earth metal (such as Ba, Ca, Sr, and Mg), an alkali metal (such as K, Na, Li, and Cs), a rare earth metal (such as La, Y, Pr, and Nd), or combinations thereof. These metals are typically found in the form of oxides. The oxidation/reduction catalyst is preferably one or more noble metals, more preferably platinum, palladium, and/or rhodium. Preferably, platinum is included to perform the oxidation function and rhodium is included to perform the reduction function. The oxidation/reduction catalyst and the $NO_x$ adsorbent are preferably loaded on a support material such as an inorganic oxide for use in the exhaust system.

Suitable $NO_x$ reduction catalysts also include selective catalytic reduction (SCR) catalysts. A SCR catalyst is a catalyst that reduces $NO_x$ to $N_2$ by reaction with nitrogen compounds (such as ammonia or urea) or hydrocarbons (lean $NO_x$ reduction). Preferably, the SCR catalyst is comprised of a vanadia-titania catalyst, a vanadia-tungsta-titania catalyst, or a transition metal/molecular sieve catalyst. The transition metal/molecular sieve catalyst comprises a transition metal and a molecular sieve, such as aluminosilicate zeolites and silicoaluminophosphates.

Preferred transition metals include chromium, cerium, manganese, iron, cobalt, nickel and copper, and mixtures of any two or more thereof. Iron and copper are particularly preferred. The molecular sieve is preferably a beta zeolite, a faujasite (such as an X-zeolite or a Y-zeolite, including NaY and USY), an L-zeolite, a ZSM zeolite (e.g., ZSM-5, ZSM-48), an SSZ-zeolite (e.g., SSZ-13, SSZ-41, SSZ-33), a ferrierite, a mordenite, a chabazite, an offretite, an erionite, a clinoptilolite, a silicalite, an aluminum phosphate zeolite (including metalloaluminophosphates such as SAPO-34), a mesoporous zeolite (e.g., MCM-41, MCM-49, SBA-15), or mixtures thereof; more preferably, the molecular sieve is a beta zeolite, a ferrierite, or a chabazite. Preferred SCR catalysts include Cu-CHA, such as Cu-SAPO-34, Cu-SSZ-13, and Fe-Beta zeolite.

The $NO_x$ reduction catalyst is preferably an SCR catalyst.

The $NO_x$ reduction catalyst is preferably coated on a ceramic or a metallic substrate. The substrate is typically designed to provide a number of channels through which vehicle exhaust passes, and the surface of the channels will be preferably be coated with the $NO_x$ reduction catalyst.

A ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred. A metallic substrate may be made of any suitable metal, and in particular heat-resistant metals and metal alloys such as titanium and stainless steel as well as ferritic alloys containing iron, nickel, chromium, and/or aluminum in addition to other trace metals.

The substrate for the $NO_x$ reduction catalyst may be a filter substrate or a flow-through substrate. Preferably, the $NO_x$ reduction catalyst is coated onto a filter. When the $NO_x$ reduction catalyst is an SCR catalyst, the combination of an SCR catalyst and a filter is known as a selective catalytic reduction filter (SCRF). SCRFs are single-substrate devices that combine the functionality of an SCR and particulate filter.

When the $NO_x$ reduction catalyst is an SCR catalyst, the exhaust system preferably comprises a means for introducing a nitrogenous reductant into the exhaust system upstream of the SCR catalyst. The reductant is added to the flowing exhaust gas by any suitable means for introducing the reductant into the exhaust gas. Suitable means include an injector, sprayer, or feeder, and is preferably an injector. Such means are well known in the art.

The nitrogenous reductant for use in the system can be ammonia per se, hydrazine or an ammonia precursor selected from the group consisting of urea (($NH_2$)$_2$CO), ammonium carbonate, ammonium carbamate, ammonium hydrogen carbonate and ammonium formate. Urea is particularly preferred.

The exhaust system may also comprise a means for controlling the introduction of reductant into the exhaust gas in order to reduce $NO_x$ therein. Preferred control means include an electronic control unit, optionally an engine control unit, and may additional comprise a $NO_x$ sensor located downstream of the NO reduction catalyst.

The exhaust system of the invention also comprises a particulate filter. The particulate filter is preferably a wall-flow filter.

The filter and $NO_x$ reduction catalyst can be arranged in any suitable configuration. For instance, the $NO_x$ reduction catalyst may be located downstream of the filter. If a means for introducing nitrogenous reductant is utilized when the $NO_x$ reduction catalyst is an SCR catalyst, the means for introducing reductant into a flowing exhaust gas is suitably located between the filter and the SCR catalyst.

Preferably, the $NO_x$ reduction catalyst is located on the particulate filter, most preferably in the form of a selective catalytic reduction filter (SCRF). Where the filter is a wall-flow filter, the $NO_x$ reduction catalyst can be formulated as a washcoat that permeates the walls of the filter. This can be done, for example, by milling the catalyst to an average particle size of ≤5 μm.

Preferably, the exhaust system will comprise a NO oxidation catalyst (for example, a diesel oxidation catalyst) for oxidizing NO to nitrogen dioxide. The NO oxidation catalyst is preferably located upstream of the filter and/or the $NO_x$ reduction catalyst, relative to the direct of exhaust gas flow through the system. The NO oxidation catalyst preferably comprises a platinum group metal, most preferably platinum.

The exhaust system may also comprise an ammonia oxidation catalyst (or "ammonia slip catalyst") disposed downstream of the $NO_x$ reduction catalyst and upstream of the EGR, relative to the direct of exhaust gas flow through the system. Preferably, the ammonia oxidation catalyst includes platinum, palladium, or a combination thereof, with platinum or a platinum/palladium combination being preferred. Preferably, the ammonia oxidation catalyst comprises platinum and/or palladium supported on a metal oxide, more preferably a high surface area support, including but not limited to alumina.

The ammonia oxidation catalyst may be applied to a flow-through monolith substrate, such as flow-through metallic or cordierite honeycombs, but is preferably loaded onto the same substrate as the $NO_x$ reduction catalyst, wherein the upstream zone is loaded with the $NO_x$ reduction catalyst and the downstream zone is loaded with the ammonia oxidation catalyst, relative to the direction of exhaust gas flow through the system.

Preferred embodiments of the exhaust system, prior to the low pressure EGR circuit, may thus comprise a variety of different configurations, including: (1) a diesel oxidation catalyst (DOC), followed by a particulate filter, then a means for introducing a nitrogenous reductant, followed by an SCR catalyst; (2) a DOC, a means for introducing a nitrogenous reductant, then a SCRF, followed by a SCR catalyst; (3) a DOC, followed by a SCRF, then an ammonia oxidation catalyst; and other possible combinations.

The system then comprises a low pressure exhaust gas recirculation (EGR) circuit for connecting the exhaust system downstream of the filter and the $NO_x$ reduction catalyst to an intake of the engine.

The EGR circuit comprises an $N_2O$-producing catalyst. The $N_2O$-producing catalyst reacts $NH_3$ with $NO_2$ in the EGR circuit to produce $N_2O$. Any catalyst that converts $NH_3$ and $NO_2$ to $N_2O$ is suitable. Preferred $N_2O$-producing catalysts include manganese supported on an inorganic oxide, but may also include any other transition metal supported on an inorganic oxide.

The inorganic oxide most commonly includes oxides of Groups 2, 3, 4, 5, 13 and 14 elements. Useful inorganic oxides preferably have surface areas in the range 10 to 700 $m^2/g$, pore volumes in the range 0.1 to 4 mL/g, and pore diameters from about 10 to 1000 Angstroms. The inorganic oxide is preferably alumina, silica, titania, zirconia, niobia, tantalum oxides, molybdenum oxides, tungsten oxides, rare earth oxides (in particular ceria or neodymium oxide), or mixed oxides or composite oxides of any two or more thereof, e.g. silica-alumina, ceria-zirconia or alumina-ceria-zirconia, and can also be a zeolite.

The $N_2O$-producing catalyst is preferably prepared by adding a manganese compound (such as manganese acetate) to the inorganic oxide by any known means, the manner of addition is not considered to be particularly critical. For example, the manganese compound may be added to the inorganic oxide by impregnation, adsorption, ion-exchange, incipient wetness, precipitation, or the like to produce the $N_2O$-producing catalyst.

The $N_2O$-producing catalyst is preferably located in or on a flow-through monolith substrate. The flow-through substrate is preferably a ceramic or metallic substrate. In particular, the flow-through substrate is a flow-through monolith preferably having a honeycomb structure with many small, parallel thin-walled channels running axially through the substrate and extending throughout the substrate. The channel cross-section of the substrate may be any shape, but is preferably square, sinusoidal, triangular, rectangular, hexagonal, trapezoidal, circular, or oval.

The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred. The metallic substrate may be made of any suitable metal, and in particular heat-resistant metals and metal alloys such as titanium and stainless steel as well as ferritic alloys containing iron, nickel, chromium, and/or aluminum in addition to other trace metals.

Preferably, the $N_2O$-producing catalyst is coated onto the flow-through substrate by any known means, more preferably the $N_2O$-producing catalyst is deposited on the substrate using washcoat procedures. The washcoating is preferably performed by first slurrying finely divided particles of the $N_2O$-producing catalyst in an appropriate solvent, preferably water, to form the slurry. The slurry preferably contains between 5 to 70 weight percent solids, more preferably between 10 to 50 weight percent. Preferably, the $N_2O$-producing catalyst particles are milled or subject to another comminution process in order to ensure that substantially all of the solid particles have a particle size of less than 20 microns in an average diameter, prior to forming the slurry. Additional components, such as stabilizers or promoters may also be incorporated in the slurry as a mixture of water soluble or water-dispersible compounds or complexes. The substrate may then be coated one or more times with the slurry such that there will be deposited on the substrate the desired loading of catalytic materials. The coated substrate is typically dried and then calcined by heating at an elevated temperature. Preferably, the calcination occurs at 400 to 600° C. for approximately 1 to 8 hours.

FIG. 1 shows one embodiment of the invention, showing a cross section of the apparatus. The apparatus comprises an engine 10 and an exhaust system 12. The exhaust system comprises a conduit 14 linking the engine to an optional diesel oxidation catalyst (DOC) 16. The exhaust gas from the engine 10 flows to the optional DOC 16 then passes to a SCRF 20 before passing to an optional ammonia oxidation catalyst 22. The optional nitrogenous reductant means 18 is utilized to add a nitrogenous reductant such as urea to the exhaust gas flowing into the SCRF 20. The low pressure exhaust gas recirculation circuit 26 comprises an exhaust gas recirculation valve 24. Disposed within the EGR circuit 26, $N_2O$-producing catalyst 28 is utilized to convert $NH_3$ and $NO_2$ in the EGR circuit to produce $N_2O$, which is then fed back to an intake 30 of the engine 10.

We claim:

1. An exhaust system for an internal combustion engine, the system comprising a particulate filter, one or more $NO_x$ reduction catalysts, and a low pressure exhaust gas recirculation (EGR) circuit for connecting the exhaust system downstream of the filter and the one or more $NO_x$ reduction catalysts to an intake of the engine, wherein the EGR circuit comprises a $N_2O$-producing catalyst, and wherein the $N_2O$-producing catalyst comprises manganese supported on an inorganic oxide.

2. The exhaust system of claim 1, wherein one or more $NO_x$ reduction catalysts is located on the filter.

3. The exhaust system of claim 1, wherein the one or more $NO_x$ reduction catalysts are a selective catalytic reduction catalyst.

4. The exhaust system of claim 3, wherein the selective catalytic reduction catalyst comprises a transition metal and molecular sieve.

5. The exhaust system of claim 3, further comprising a means for introducing a nitrogenous reductant into the exhaust system upstream of the selective catalytic reduction catalyst.

6. The exhaust system of claim 5, wherein the nitrogenous reductant is ammonia, hydrazine or an ammonia precursor selected from the group consisting of urea (($NH_2$)$_2$CO), ammonium carbonate, ammonium carbamate, ammonium hydrogen carbonate and ammonium formate.

7. The exhaust system of claim 1, wherein the one or more $NO_x$ reduction catalysts is a lean $NO_x$ trap.

8. The exhaust system of claim 1, wherein the $N_2O$-producing catalyst is located in or on a flow-through monolith substrate.

9. The exhaust system of claim 1, further comprising a NO oxidation catalyst located upstream of the particulate filter.

10. The exhaust system of claim 1 further comprising an ammonia oxidation catalyst disposed downstream of the one or more $NO_x$ reduction catalysts and upstream of the EGR, relative to the direction of exhaust gas flow through the system.

11. The exhaust system of claim 10, wherein the $NO_x$ reduction catalyst and the ammonia oxidation catalyst are loaded onto the same substrate, wherein the front is loaded with the $NO_x$ reduction catalyst and the rear is loaded with the ammonia oxidation catalyst.

* * * * *